United States Patent
Mayer et al.

(10) Patent No.: US 6,390,549 B1
(45) Date of Patent: May 21, 2002

(54) BACKREST FOR A VEHICLE SEAT

(75) Inventors: Christian Mayer, Ditzinger; Vasilios Orizaris, Renningen; Albert Reitinger, Berglen; Oana Schüszler, Wimsheim, all of (DE)

(73) Assignee: DaimlerChrysler AG, Stuttgart (DE)

( * ) Notice: Subject to any disclaimer, the term of this patent is extended or adjusted under 35 U.S.C. 154(b) by 49 days.

(21) Appl. No.: 09/595,939

(22) Filed: Jun. 16, 2000

(30) Foreign Application Priority Data

Jun. 16, 1999 (DE) .......................... 199 27 403

(51) Int. Cl.$^7$ ................................ B60N 2/42
(52) U.S. Cl. ................ 297/216.14; 297/216.12; 297/216.13; 297/216.15; 297/216.16
(58) Field of Search ................ 297/216.12, 216.13, 297/216.14, 216.15, 216.16

(56) References Cited

U.S. PATENT DOCUMENTS

| | | | | |
|---|---|---|---|---|
| 3,680,912 A | * | 8/1972 | Matsuura | 297/216.12 |
| 5,580,124 A | * | 12/1996 | Dellanno | 297/216.12 |
| 5,769,489 A | * | 6/1998 | Dellanno | 297/216.14 |
| 5,772,280 A | * | 6/1998 | Massara | 297/216.12 |
| 5,782,529 A | * | 7/1998 | Miller, III et al. | 297/216.13 |
| 5,788,271 A | * | 8/1998 | Sotelo | 297/112 |
| 5,833,312 A | * | 11/1998 | Lenz | 297/216.13 |
| 5,902,010 A | * | 5/1999 | Cuevas | 297/216.13 |
| 6,030,036 A | * | 2/2000 | Fohl | 297/216.14 |
| 6,273,511 B1 | * | 8/2001 | Wieclawski | 297/463.1 |

FOREIGN PATENT DOCUMENTS

| | | |
|---|---|---|
| DE | 198 82 039 | 12/1999 |
| WO | PCT/SE94/01002 | 10/1994 |

* cited by examiner

*Primary Examiner*—Carl D. Friedman
*Assistant Examiner*—Dennis L. Dorsey
(74) *Attorney, Agent, or Firm*—Crowell & Moring LLP

(57) ABSTRACT

A backrest for a vehicle seat, having a head restraint and backrest padding, and having a supporting element which is intended for the seat occupant's back and, is compliant, at least in the upper backrest region, in such a manner that the seat occupant's back is able to shift rearwards relative to the head restraint in the event of a rear-end collision of the vehicle. The supporting element is formed by a shaped cushion that is integrated in the backrest padding in the upper backrest region, and filled with a gaseous medium, in particular air. In the event of a collision this supporting element can suddenly be deflated.

16 Claims, 2 Drawing Sheets

BACKREST FOR A VEHICLE SEAT

CROSS REFERENCE TO RELATED APPLICATION

Priority is claimed with respect to German Application No. 199 27 403.7-16 filed in Germany on Jun. 16, 1999, the disclosure of which is incorporated herein by reference.

BACKGROUND OF THE INVENTION

The invention relates to a backrest for a vehicle seat.

In the case of so-called rear-end collisions, another vehicle impacts against the rear of one's own vehicle, or one's own vehicle reverses into an obstacle. In a first phase, the seat occupant's head moves rearwards translatively relative to the occupant's trunk, since the seat occupant's body or trunk is accelerated forwards by the seat and the head, on account of its inertia, is unable to follow this movement. In a second phase, an accelerated rotation of the head to the rear takes place. The head restraint's role is essentially to prevent hyperextension of the spinal column in the second phase.

In a known backrest for a vehicle seat of the type mentioned at the beginning (WO 95/11818), the cervical vertebra distortion risk existing in the first phase of the rear-end collision because of the relative translation between the head and upper body is combated by a fixed supporting element in the backrest padding, which supporting element is designed in such a manner that it yields, exclusively in the event of a collision, in such a way that the seat occupant's back, at least in the shoulder region, dips into the backrest padding and therefore moves rearwards and relative to the head restraint, as a result of which the translation from upper body to the head is avoided. In one exemplary embodiment, the supporting element is designed as a net which is connected to the stiff seat frame by straps which do not permit a substantial rearwards shifting of the net during normal operation. In contrast, in the event of a rear-end collision, the upper part of the net moves rearwards and the seat occupant's upper body therefore likewise moves rearwards, so that it is brought against the head restraint with substantially reduced relative movement between the head and upper body. The construction used for this is bulky and leads to increased reaction times. In addition, the weight of the backrest, and therefore the weight of the vehicle seat, is not inconsiderably increased.

The invention is based on the object of improving a backrest of the type mentioned at the beginning with regard to minimizing the possibility of cervical vertebra distortions and, in the process, of taking heed that the backrest is of lightweight construction.

SUMMARY OF THE INVENTION

The backrest according to the invention has the advantage that by means of the shaped cushion which is integrated in the upper backrest region, there is present, in normal operation, a comfort-orientated seat contour which makes it possible, in the event of a rear-end collision, for the backrest padding to yield inelastically virtually without any delay, thereby ensuring a virtually parallel movement of the upper body and head until the head is intercepted by the head restraint. The gas-filled shaped cushion is extremely light, does not lead to an increase in weight of the backrest and can be used in addition and in a simple manner in order to form the seat contour. If, according to a preferred embodiment of the invention, the rapid elimination of air from the shaped cushion takes place by means of a valve controlled as a function of an acceleration sensor, this valve can also be used in order to fill the shaped cushion, so that the possibility arises of an individually adjustable seat contour.

According to an advantageous embodiment of the invention, the contour, which is present behind the shaped cushion, of the padding front surface facing the seat user is designed in such a manner that when the shaped cushion is deflated, the said contour, together with the head-restraint front surface, forms an optimum supporting surface for the seat user's head and body. The stiffness of this contour and the stiffness of the head restraint are matched to each other here in such a manner that with further shifting back of the seat occupant in the course of the rear-end collision, a substantially parallel movement of the seat occupant's head and upper body is ensured. By means of these structural measures, the head and upper body are advantageously aligned with respect to each other, and during the further course of the rear-end collision are kept in this fixed alignment until the crash energy acting upon the seat user is substantially degraded.

The degradation of the crash energy is assisted in that, according to an advantageous embodiment of the invention, an energy-dissipating, irreversibly deformable supporting structure, for example made of open-pore foam, is arranged in the padding behind the shaped cushion.

According to an advantageous embodiment of the invention, in order to suddenly deflate the shaped cushion, a tear-open seam which splits open in the event of a rear-end impact is provided in the shaped cushion. This tear-open seam can be made to split open by body weight, or a sensor sensing the rear-end impact is provided, which sensor pulls open the tear-open seam, for example by means of a ripcord, when an acceleration value is exceeded. A sensor of this type is, for example, an inert mass which, in the event of a rear-end impact, is displaced rearwards relative to the seat and thereby pulls the ripcord.

According to an alternative embodiment of the invention, in order to deflate the shaped cushion, a valve is connected to the shaped cushion, and an acceleration meter and also a control device are provided, the said control device opening the valve when an acceleration value measured by the acceleration meter is exceeded.

In order to accelerate the deflating of the shaped cushion, according to an advantageous development, the valve outlet is connected to a vacuum.

According to an advantageous embodiment of the invention, a second shaped cushion is arranged in the lumbar region of the backrest padding, which shaped cushion is filled with a gaseous medium and is deflated in a defined manner in the event of a rear-end impact. This second shaped cushion in the lumbar region prevents the seat occupant's body from pressing upwards against the backrest, which is known as ramping. At relatively high crash speeds, the second shaped cushion provides a further deformation path, so that the load on the seat occupant is reduced. In addition, the second shaped cushion can be used to give ideal supporting of the spinal column during normal operation, and the seat contour can be adapted individually to the seat occupant's back.

BRIEF DESCRIPTION OF THE DRAWINGS

The invention is described in greater detail in the following with reference to exemplary embodiments illustrated in the drawing, in which, in each case in a schematic illustration.

DETAILED DESCRIPTION OF THE PREFERRED EMBODIMENTS

Figure 1:
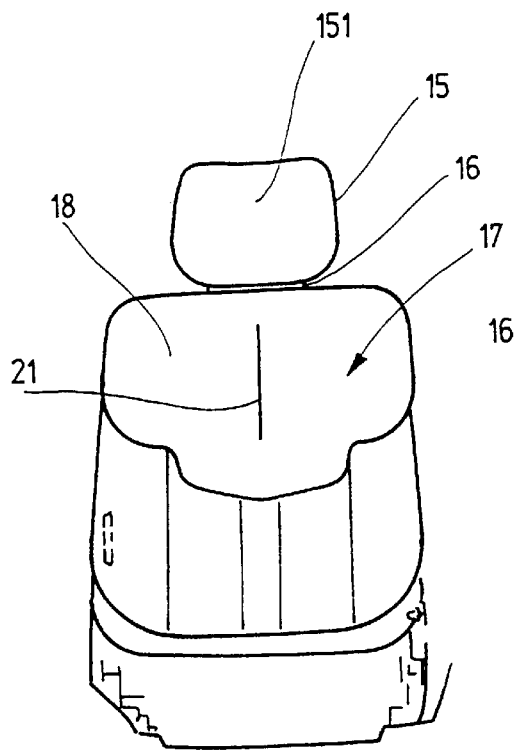
FIG. 1 shows a front view of a vehicle seat with a seat part, backrest and head restraint.
Figure 2:
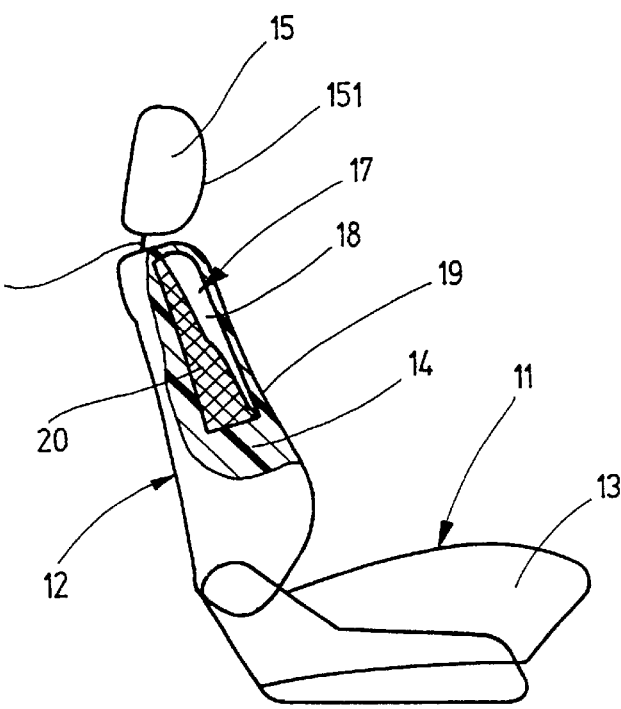
FIG. 2 shows a side view of the vehicle seat in FIG. 1.

The vehicle seat, which is illustrated in front view in FIG. 1 and in side view in FIG. 2, has, in a known manner, a seat part 11, which is held adjustably on the vehicle floor, and a backrest 12, which is connected to the seat part 11 via a pivoting latching means in order to adjust the inclination. The seat part 11 and the backrest 12 each have padding (seat padding 13 and backrest padding 14), which is held in a frame (seat frame and backrest frame) which is not illustrated here. Arranged on the upper side of the backrest 12 is a height-adjustable head restraint 15 whose supporting bracket 16 is supported on the backrest frame. Arranged in the upper backrest region is a supporting element 17 which is intended for a seat occupant's back and, just in the case of a rear-end collision of the vehicle, is compliant in such a manner that the seat occupant's back is able to shift rearwards relative to the head restraint 15, so that in the first phase of a rear-end collision, translation of the head rearwards relative to the upper body is avoided, or at least substantially suppressed. In order to ensure that the seat occupant's back shifts back with little delay, the supporting element 17 is designed as a shaped cushion 18 which is integrated in the backrest padding 14, is filled with a gaseous medium, here with air, and with a rear-end impact can suddenly be deflated. The shaped cushion 18, which fills the entire upper backrest region of the backrest 12 and extends downwards in a tongue-like manner in the central region of the backrest 12, is covered by the padding cover 19 of the backrest, so that it is invisible. The padding cover 19, which can be seen in FIG. 2, is omitted in FIG. 1 in order to illustrate the shaped cushion 18. Behind the shaped cushion 18, the contour of the padding front surface facing the seat occupant is designed in such a manner that when the shaped cushion 18 is deflated, the said contour, together with the front surface 151 of the head restraint 15, forms an optimum supporting surface for the seat occupant's head and upper body. The stiffness of this contour and the stiffness of the head restraint 15 are matched to each other in such a manner that, with further shifting back of the seat occupant in the course of the rear-end collision, a substantially parallel movement of the seat occupant's head and upper body is ensured. Behind this final-position contour it there is also arranged an energy-dissipating, irreversibly deforming supporting structure 20 (FIG. 2) which consists, for example, of crushable foam or open-pore polyurethane foam.

Figure 3:
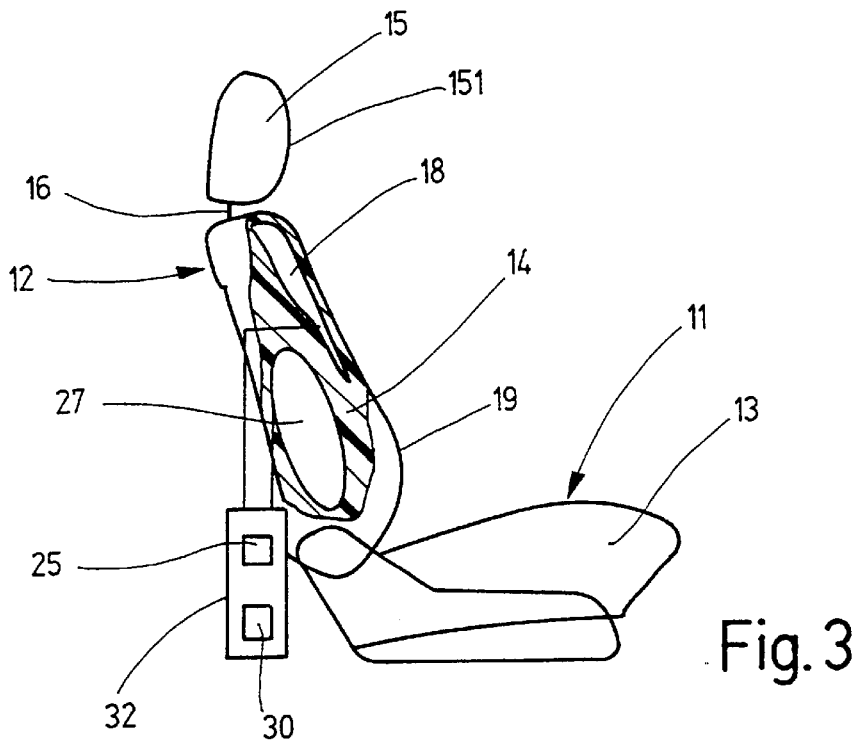
FIG. 3 shows a side view of a vehicle seat according to a further exemplary embodiment.
Figure 4:
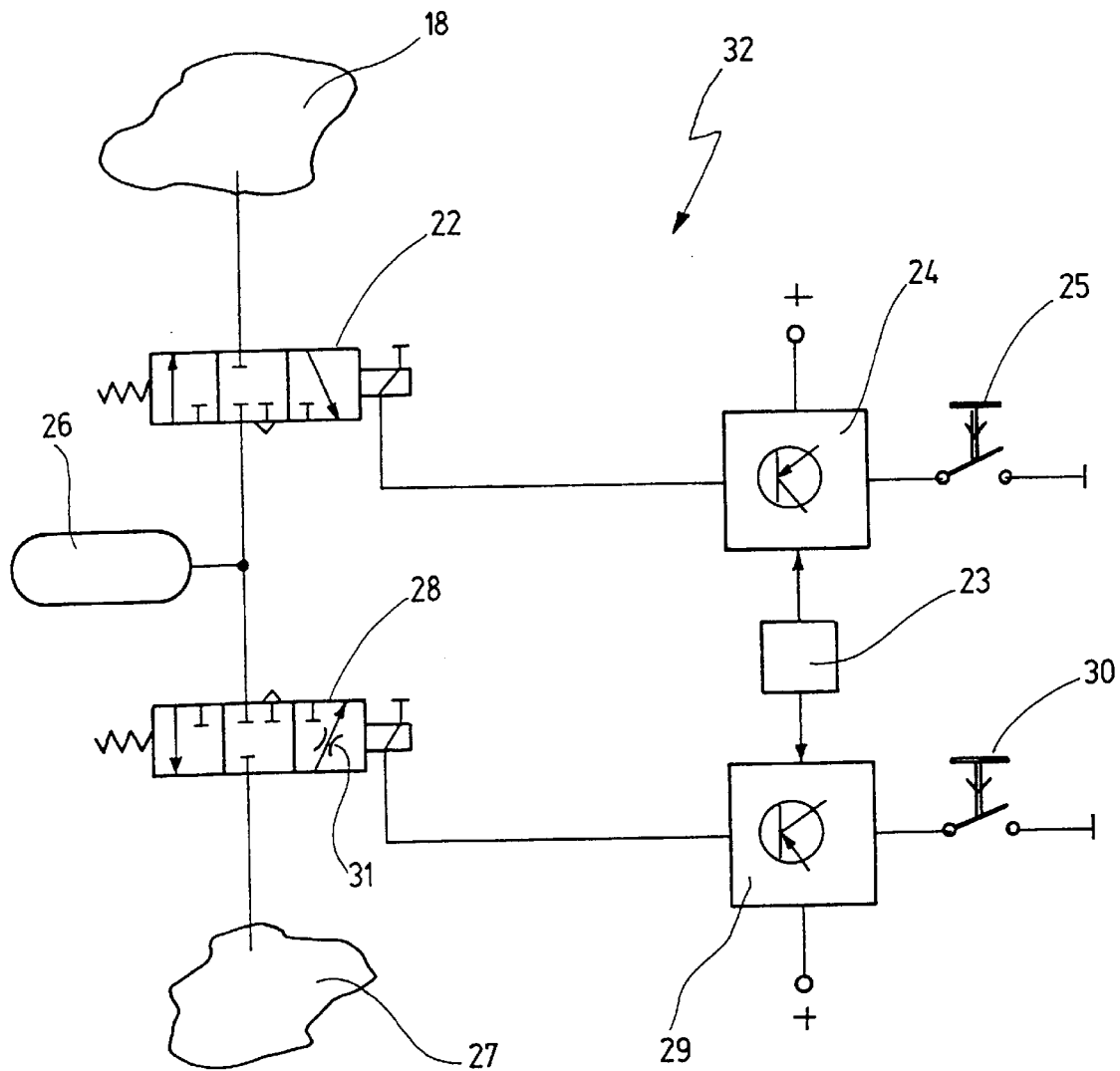
FIG. 4 shows a block diagram of a control unit on the vehicle seat in FIG. 3.

In order to suddenly deflate the shaped cushion 18, a tear-open seam 21 which splits open in the event of a rear-end impact is provided in the shaped cushion (FIG. 1). This tear-open seam 21 can be configured in such a manner that it is made to split in the event of a rear-end collision by the seat occupant's body weight. However, in order to shorten the response time of the tear-open seam 21 splitting open, a sensor may also be provided which mechanically rips open the rip seam when a specified acceleration value is exceeded. A sensor of this type may, for example, be an inert mass which is held on the seat in a translatory manner in the direction of travel, is moved rearwards in the event of a rear-end collision and therefore pulls a ripcord acting on the tear-open seam 21. Alternatively, in order to deflate the shaped cushion 18, a valve 22 can be connected to the shaped cushion 18, as is illustrated in FIGS. 3 and 4. An acceleration meter 23 sensing a rear-end collision is connected to the input of a control device 24 which opens the valve 22, when a specified acceleration value is exceeded, and therefore suddenly eliminates air from the shaped cushion 18. In the exemplary embodiment of FIG. 4, the valve 22 is designed as an electromagnetically controlled 3/3-way valve having spring resetting and whose electromagnet is connected to the output of the control device 24. The control device 24 is connected on the input side to the acceleration meter 23 and to a filling button 25, which is to be operated manually. Of the three valve connections of the valve 22, one is connected to a compressed-air store 26 and one to the shaped cushion 18, while the third valve connection forms an output for eliminating air. In the basic position of the valve 22, all of the valve connections are blocked. In the A event of a rear-end collision, the acceleration value measured by the acceleration meter 23 exceeds the allowed value, and the control device 24 activates the valve 22 in such a manner that its control slide is displaced to the left in FIG. 4, as a result of which the shaped cushion 18 is connected across the output for eliminating air, and the compressed-air store 26 is blocked off. By means of the filling button 25, the shaped cushion 18 can be refilled and, in the process, a comfort-orientated, individual seat contour can be set in the upper backrest region. If the said filling button is actuated, the control device 24 moves the control slide of the valve 22 to the right in FIG. 4, as a result of which the shaped cushion 18 is connected to the compressed-air store 26.

In the case of the vehicle seat illustrated in the side view of FIG. 3, in addition to the shaped cushion 18 in the upper backrest region a second shaped cushion 27 is also integrated in the lumbar region of the backrest 12 in the backrest padding 14. Also connected to this shaped cushion 27 is a valve 28 which, in the same manner as the valve 22, is designed as a 3/3-way solenoid valve with spring resetting. Of the three valve connections of the valve 28 again one is connected to the compressed-air store 26 and the other to the shaped cushion 27, while the third valve connection forms an output for eliminating air. In the blocked state of the valve 28 (as shown in FIG. 4), the shaped cushion 27 is air-filled and separated from the compressed-air store 26. In the event of a rear-end collision, the shaped cushion 27 is deflated in a defined manner, so that a deformation path is provided for the seat occupant's body, which path prevents what is known as ramping, i.e. upwards pressing of the body against the backrest 12. For this purpose, the valve 28 is controlled by a control device 29 which is connected on the input side to the acceleration meter 23 and to a further filling button 30, which is to be actuated manually. In the event of a collision, the solenoid valve 28, which is activated by the control device 29, is switched over into its switch position which is illustrated on the right in FIG. 4 and in which the compressed-air store 26 is blocked off and the shaped cushion 27 is connected, via an adjustable constriction 31, to the output for eliminating air. By appropriately adjusting the constriction 31, the desired time profile for deflating the shaped cushion is achieved. By means of the filling button 30 the shaped cushion 27 can be filled and, in the process, a comfort-orientated seat contour in the backrest region can be set individually.

In the case of the vehicle seat illustrated in FIG. 3, the two control devices 24 and 29 for the shaped cushions 18 and 27, the acceleration sensor 23 and the compressed-air store 26 are combined in a control unit 32 at which the two filling buttons 25 and 30 for the upper shaped cushion 18 and lower shaped cushion 27 are accessible. The control unit 32 can be placed on the seat or at a suitable location in the vehicle.

The invention is not restricted to the exemplary embodiments described.

Since the gap between the back of the seat occupant's head and the head restraint 15 is an important parameter which influences the kinematics of the seat occupant during the rear-end impact and differs depending on the seat construction, in a preferred refinement of the invention a so-called crash-active head restraint 15 is used which is activated during the crash and moves forwards in order to suddenly minimize a gap present between the back of the seat occupant's head and the front surface 151, facing it, of the head restraint 15. The head restraint 15 is preferably adjusted within a short time period, for example of less than 50 ms, in such a manner that the front surface 151 of the head restraint 15 executes a translation forwards and a rotation upwards. Exemplary embodiments for so-called crash-active head restraints are described in DE 195 48 339 A1, which is hereby incorporated by reference.

A pneumatic device which is described therein, is intended for adjustment of the head restraint (FIGS. 3–5 of DE 195 48 339 A1) and which has a small mass is preferred. In this case, in the event of a crash the air flowing out of the shaped cushion 18, which is integrated in the backrest 12, can be used in order to actuate this device. The combination of the shaped cushion 18 integrated in the backrest 12 together with a crash-active head restraint 15 has the advantage that during the crash, the gap, defined by the seat construction, between the back of the head and head restraint is eliminated, or is at least minimized, and, in this case, this gap between the head and head restraint 15 is already reduced by evacuation of air from the shaped cushion 18 in the backrest 12, and the crash-active head restraint 15 has to cover a smaller distance.

While the above description constitutes the preferred embodiment of the invention, it will be appreciated that the invention is susceptible to modification, variation, and change without departing from the proper scope or fair meaning of the accompanying claims.

What is claimed is:

1. A backrest for a vehicle seat, comprising:
   a head restraint,
   backrest padding, and
   a supporting element which is intended for a back of a seat occupant and, just in the case of a rear-end collision of the vehicle, the supporting element is yieldable, at least in an upper backrest region, in such a manner that at least the upper back of the seat occupant is able to shift rearwards relative to the head restraint,
      wherein the supporting element is formed by a shaped cushion which is integrated in the backrest padding in the upper backrest region, is filled with a gaseous medium and with the rear-end collision can suddenly be deflated.

2. The backrest according to claim 1, wherein a contour surface, which is present behind the shaped cushion, of the padding front surface facing the seat occupant is designed in such a manner that when the shaped cushion is deflated, the contour, together with the head-restraint front surface, forms an optimum supporting surface for the head and body of the seat occupant.

3. The backrest according to claim 2, wherein a stiffness of the contour and a stiffness of the head restraint are matched to each other in such a manner that with further shifting back of the seat occupant during the rear-end collision, a substantially parallel movement of the head and body of the seat occupant is ensured.

4. The backrest according to claim 3, wherein an energy-dissipating, irreversibly deformable supporting structure is arranged behind the shaped cushion.

5. The backrest according to claim 1, wherein in order to deflate the shaped cushion, a tear-open seam which splits open in the event of a rear-end impact is provided in the shaped cushion.

6. The backrest according to claim 5, wherein a sensor sensing a rear-end collision is provided, which sensor pulls open the tear-open seam when a specified acceleration value is exceeded.

7. The backrest according to claim 1,
   wherein in order to deflate the shaped cushion, a valve is connected to the shaped cushion, and
   wherein an acceleration meter, sensing a rear-end collision, and a control device are provided, the control device opening the valve when a specified acceleration value is exceeded.

8. The backrest according to claim 7, wherein the valve outlet is connected to a vacuum.

9. The backrest according to claim 7,
   wherein the valve is a multiway valve having at least three valve connections, a first connection forming a valve outlet, a second connection being connected to the shaped cushion, and a third connection being connected to a compressed-medium store, and
   wherein when a manual filling button is actuated, the control device transfers the valve into a valve position leading to the filling of the shaped cushion.

10. The backrest according to claim 1, wherein a second shaped cushion is integrated in a lumbar region of the backrest padding, which shaped cushion is filled with a gaseous medium and is deflated in a defined manner in the event of the rear-end collision.

11. The backrest according to claim 10, wherein provision is made of a multiway valve having at least three valve connections, a first connection forming a valve outlet, a second connection being connected to the shaped cushion, and a third connection being connected to the compressed-medium store, and also of a control device which is connected to an acceleration meter and to a manual filling button, is intended for the valve and switches over the valve to eliminating air from the shaped cushion, when a specified measured value of the acceleration meter is exceeded, and switches the valve over to filling the shaped cushion, when the filling button is actuated.

12. The backrest according to claim 10, wherein the control device and the valve are combined in a control unit.

13. The backrest according to claim 1, wherein air is used as the gaseous medium.

14. The backrest according to claim 1, wherein the head restraint is designed as a crash-active head restraint which, in the event of rear-end collision, by moving forwards at least one part of the head restraint at least minimizes a gap present between a back of the head of the seat occupant and the front surface of the head restraint.

15. The backrest according to claim 14, wherein the movement is brought about by way of a pneumatic device integrated in the head restraint, and the gaseous medium emerging from the shaped cushion in the event of rear-end collision is used in order to actuate the pneumatic device.

16. A backrest according to claim 1, wherein the shaped cushion is at a front surface of the vehicle seat.

* * * * *